Patented May 6, 1941

2,241,323

UNITED STATES PATENT OFFICE 2,241,323

PROCESS FOR PREPARING POLYAMIDES

Crawford H. Greenewalt, Wilmington, Del., assignor to E. I. du Pont de Nemours and Company, Wilmington, Del., a corporation of Delaware No Drawing. Application September 30, 1938, Serial No. 232,680

6 Claims. (Cl. 260—2)

This invention relates to synthetic polymeric materials and more particularly to the preparation of polyamides.

A new class of polyamides obtained by polymerizing amino acids or their amide-forming derivatives and by reacting diamines with dicarboxylic acids or amide-forming derivatives of dibasic carboxylic acids has been described in Patents 2,071,250 and 2,071,253. These polyamides are valuable in the manufacture of fibers and textile products because filaments formed from the polyamides possess the valuable property of being capable of being cold drawn into fibers which upon X-ray examination exhibit molecular orientation along the fiber axis.

For most purposes the preparation of polyamides by the above mentioned methods is wholly satisfactory. These methods, however, involve the liberation of considerable quantities of water or other by-product which must be removed from the system. This fact renders the process unsuited for some uses where disposal of the water or other by-product constitutes a serious problem.

This invention has as an object a new method for preparing polyamides. A further object is to provide a method of preparing polyamides which avoids or at least greatly reduces the liberation of water or other by-product. Other objects will appear hereinafter.

I have now found that polyamides apparently identical in properties and structure to those resulting from the previously mentioned methods are obtained by heating cyclic amides having seven or more annular atoms. When, for instance, the cyclic amides are monomeric or dimeric hexamethylene adipamide, heating to a temperature above their melting point, such as 280° C., converts these compounds into polymeric amides similar to those obtained by heating adipic acid with hexamethylene diamine. Relatively small amounts of gaseous materials are evolved during the conversion of the cyclic amides to polymers, and it is possible that these by-products catalyze the reaction. The time of heating required to effect polymerization depends to a large extent on the size of the cyclic amide ring. For example, the cyclic amides containing a lesser number of annular atoms require long periods of heating, sometimes from 100 to 200 hours, whereas rings of larger size, e. g. containing fourteen annular atoms or more, are converted to polymers in approximately the same length of time as that required for the preparation of polyamides from diamines and dibasic acids under similar conditions.

The following examples are illustrative of methods that may be used for practicing my invention.

Example I

One part of neutral cyclic monomeric hexamethylene adipamide (14 annular atoms; M. P. 248° C.) was placed in a suitable vessel and the air displaced by alternately evacuating and admitting oxygen-free nitrogen. The product was then heated to 285° C. under 1 mm. pressure. The molten material gradually increased in viscosity as the heating continued. At the end of two hours the vessel was cooled to room temperature and the solid polymer removed. In appearance and properties this solid resembled that obtained by heating hexamethylene diammonium adipate under similar conditions. Filaments formed by extrusion of the molten polymer or by solution methods yield oriented fibers upon cold drawing.

Example II

One part of neutral cyclic dimeric hexamethylene adipamide (containing two hexamethylene diamine and two adipic acid residues per mol; 28 annular atoms; M. P. 237° C.) was placed in a suitable vessel and the air displaced by alternately evacuating and admitting oxygen-free nitrogen. The pressure was then reduced to 1 mm. and the material heated to 285° C. The molten mass gradually increased in viscosity until the heating was discontinued at the end of two hours. On cooling to room temperatur the polymer was removed from the vessel as a solid mass resembling in every respect the polymer obtained by heating hexamethylene diammonium adipate. The polymer was found to have an intrinsic viscosity of 0.48 indicating a molecular weight of at least 3500, whereas the original dimer had an intrinsic viscosity of 0.08.

In many instances, the presence of water, alcohols, glycols, ammonia, amines, amino alcohols, mono- and dibasic acids, hydroxy acids, amino acids and the like, and any combination of these in the reaction mixture, even in minute amounts, greatly increases the rate at which the polyamide is formed from the cyclic amides.

When fiber-forming polyamides are desired, the fiber-forming stage is most simply and satisfactorily determined by touching the molten polymer with a rod and drawing the rod quickly away; if this stage has been reached, a continuous filament of considerable strength and pliability is readily formed. A less direct method of determining the fiber-forming stage is through observation of intrinsic viscosity. This stage is reached essentially when the polyamide has an intrinsic viscosity of about 0.4, where intrinsic viscosity is defined as $$\frac{\log_e \eta_r}{C}$$

in which $\eta_r$ is the viscosity of a dilute solution (e. g., 0.5% concentration) of the polymer in m-cresol divided by the viscosity of m-cresol in the same units and at the same temperature (e. g., 25° centigrade), and C is the concentration in grams of polymer per 100 cc. of solution. The filaments are further capable of being cold drawn, that is, drawn by application of tensile stress in the solid state into fibers exhibiting by X-ray examination molecular orientation along the fiber axis. If products capable of being formed into fibers of optimum quality are to be obtained, it is desirable to prolong the heating beyond that point where the intrinsic viscosity has become 0.4. In general products having an intrinsic viscosity between 0.5 and 2.0 are most useful for the preparation of fibers.

The temperatures used in the practice of the present process are preferably above the melting points of the cyclic amides and of the resultant polyamides and below temperatures which cause excessive pyrolysis of the polymer, the preferred range being generally from 200° C. to 300° C.

The time of heating may vary within rather wide limits, depending upon the temperature, and upon the properties and viscosity desired for the finished polymer.

Additional examples of cyclic amides to which the present invention is applicable are tetramethylene sebacamide, hexamethylene sebacamide, decamethylene adipamide, ω-aminoheptanoic lactam, ω-amino-octanoic lactam, ω-aminopentadecanoic lactam, ω-aminohexadecanoic lactam, and ω-aminoheptadecanoic lactam.

Viscosity stabilizing agents, that is agents which tend to prevent polymerization to an undesired degree with consequent viscosity increase at temperatures used in spinning the polyamide into fibers, may be incorporated with the cyclic amide during polymerization. These agents include small amounts of diamine or dibasic acids, such as hexamethylene diamine and adipic acid, and particularly monofunctional amide-forming reactants such as lauric, acetic, and stearic acids, ammonia, butylamine, and other monocarboxylic acids and monoamines.

The cyclic amides used in the practice of this invention have at least seven atoms in the ring. Of the cyclic amides those having at least two amide groups generally polymerize the most readily. A convenient method for obtaining these cyclic amides is described in U. S. Patent No. 2,156,300 of A. L. Lippert and E. E. Reid. In this method an aliphatic dibasic carboxylic acid or an amide-forming derivative thereof such as an ester is heated with an aliphatic diamine containing replaceable hydrogen atoms on each of the nitrogen atoms in the presence of methanol as a diluent. For the present purpose the diamine and aliphatic dibasic carboxylic acid are so chosen that the sum of the annular atoms in the cyclic amide formed is at least seven. These cyclic amides may also be obtained, as in the case of the hexamethylene adipamides of the examples, as by-products in the preparation of polyamides by heating the diamine-dibasic acid salt.

The cyclic amides used in the practice of this invention are, as will be apparent from the foregoing examples and the above mentioned patent, those derived from compounds containing amino and carboxyl groups, the latter term as used herein also designating amide-forming derivatives of carboxyl.

The polyamides obtained by the practice of this invention may be accounted for in a variety of ways. It is conceivable in some cases that, under the high temperature employed in this reaction and with the varying limits of time necessary to bring about the polymerization of rings of various sizes, some thermal decomposition first occurs liberating small quantities of water or ammonia. These pyrolysis products may act as a catalyst for the opening of the ring, and polymerization of this compound then takes place with the liberation of the catalyst. The cycle is repeated until a high molecular weight polyamide is obtained. It is also possible that one of the main reactions which accounts for the production of a high molecular weight polymer is an amide interchange. This might be described as follows: A small amount of the ring compound is opened by pyrolysis or by the use of some catalytic agent as mentioned, and this opened structure then reacts with the monomer by amide interchange to produce a straight chain polymer of higher molecular weight. The presence of small amounts of water, alcohols, amines, or acids facilitates the opening of the ring and the starting of these reactions. Once the reaction is started the catalyst or pyrolysis products are regenerated, and the reaction proceeds to a high molecular weight polymer. It is believed that the polyamides obtained by this process are linear in nature. The facts are that cyclic amides of seven or more annular groups may be polymerized by heating at elevated temperature. The time required for bringing about the polymerization of the cyclic amide varies with the size of the ring. This latter phenomenon may be due to several factors: (1) the stability of the ring, (2) the ease with which ring closure reoccurs, (3) the thermal stability of the cyclic monomer, (4) the ease of amide interchange.

The polyamides obtained by the process of this invention, in addition to being useful in the manufacture of filaments, fibers, bristles, and films, are also useful in molding and coating compositions. Since the cyclic monomeric and dimeric amides are soluble in many organic solvents, it is practicable to prepare coating compositions which may be applied from these solutions such as coatings for metallic products. These coatings may then be heated to give the insoluble polymeric amide on the metallic surface.

The present process offers a valuable advantage in the preparation of polyamides since practically no gaseous products are evolved and since no provision need be made for the disposal of water. This fact is of particular importance in the preparation of continuous coatings, molded products, and impregnated articles.

As many apparently widely different embodiments of this invention may be made without departing from the spirit and scope thereof, it is to be understood that I do not limit myself to the specific embodiments thereof except as defined in the appended claims.

I claim:

1. A process for preparing polyamides which comprises heating a cyclic amide which has at least seven annular atoms and which contains amido nitrogen as an integral part of the annular structure to a temperature above the melting point of the amide and below the temperature at which substantial pyrolysis of the resultant polyamide takes place, and continuing the heating until the polyamide obtained is capable of being formed into filaments which can be cold drawn into oriented fibers.

2. A process for preparing polyamides which comprises heating a cyclic amide which has at least two amide groups, at least seven annular atoms, and in which the amido nitrogens are an integral part of the annular structure, to a temperature above the melting point of the amide and below the temperature at which substantial pyrolysis of the resultant polyamide takes place, and continuing the heating until the polyamide obtained is capable of being formed into filaments which can be cold drawn into oriented fibers.

3. A process for preparing polyamides which comprises heating as the initial polyamide-forming reactant a cyclic amide which has at least seven annular atoms and which contains amido nitrogen as an integral part of the annular structure to a temperature above the melting point of the amide and in the range from about 200° C. to 300° C., and continuing the heating until the polyamide obtained is capable of being formed into filaments which can be cold drawn into oriented fibers.

4. A process for preparing polyamides which comprises heating as the initial polyamide-forming reactant a cyclic amide which has at least two amide groups, at least seven annular atoms, and in which the amido nitrogens are an integral part of the annular structure, to a temperature above the melting point of the amide and in the range from about 200° C. to 300° C., and continuing the heating until the polyamide obtained is capable of being formed into filaments which can be cold drawn into oriented fibers.

5. The process set forth in claim 1 in which said cyclic amide is monomeric hexamethylene adipamide.

6. The process set forth in claim 2 in which said cyclic amide is dimeric hexamethylene adipamide.

CRAWFORD H. GREENEWALT.